United States Patent
Millan

(10) Patent No.: US 9,393,892 B1
(45) Date of Patent: Jul. 19, 2016

(54) SEAT HEADREST

(71) Applicant: Sergio Millan, Santa Fe Springs, CA (US)

(72) Inventor: Sergio Millan, Santa Fe Springs, CA (US)

(73) Assignee: REINHOLD INDUSTRIES, INC., Santa Fe Springs, CA (US)

( * ) Notice: Subject to any disclaimer, the term of this patent is extended or adjusted under 35 U.S.C. 154(b) by 0 days.

(21) Appl. No.: 14/602,972

(22) Filed: Jan. 22, 2015

(51) Int. Cl.
*A47C 7/36* (2006.01)
*B60N 2/48* (2006.01)

(52) U.S. Cl.
CPC ............ *B60N 2/4882* (2013.01); *B60N 2/4808* (2013.01); *B60N 2/4838* (2013.01)

(58) Field of Classification Search
CPC .. B60N 2/4882; B60N 2/4808; B60N 2/4838; A47C 7/36; A47C 7/38
USPC .......................................... 297/406, 410, 408
See application file for complete search history.

(56) References Cited

U.S. PATENT DOCUMENTS

| | | | |
|---|---|---|---|
| 4,466,662 A | 8/1984 | McDonald et al. | |
| 4,760,503 A * | 7/1988 | VandenBerge et al. | 362/492 |
| 4,883,243 A | 11/1989 | Herndon | |
| 4,899,961 A | 2/1990 | Herndon | |
| 5,997,091 A | 12/1999 | Rech et al. | |
| 6,062,623 A * | 5/2000 | Lemmen | 296/37.8 |
| 6,250,716 B1 | 6/2001 | Clough | |
| 6,467,846 B2 | 10/2002 | Clough | |
| 6,666,517 B2 | 12/2003 | Clough | |
| 7,040,705 B2 | 5/2006 | Clough | |
| 7,264,313 B2 | 9/2007 | Clough | |
| 7,364,239 B2 | 4/2008 | Clough | |
| 2011/0094058 A1 * | 4/2011 | Van Gennep | 16/327 |

* cited by examiner

*Primary Examiner* — Milton Nelson, Jr.
(74) *Attorney, Agent, or Firm* — James E. Brunton

(57) ABSTRACT

An adjustable headrest that provides both support and comfort to the user and one that can be used in connection with various types of passenger vehicles. The headrest includes slide mechanisms for permitting easy height adjustment of the headrest and also includes an adjustment mechanism for adjusting the headrest forwardly and rearwardly. Further, the headrest includes easily adjustable, wing-like, side-support members that are pivotally connected to a centrally located, vertically adjustable head support member by specially designed hinges.

20 Claims, 9 Drawing Sheets

SEAT HEADREST

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to headrests for seats. More particularly, the invention concerns a fully adjustable headrest for use in connection with furniture and with passenger vehicles such as aircraft, trains and busses.

2. Discussion of the Prior Art

Various types of headrests for use in passenger vehicles have been suggested in the past. As the general rule, these headrests are designed primarily to satisfy safety aspects rather than to provide a comfortable seating posture. Typically, the prior art vehicle headrests comprise only a vertically adjustable head support panel designed to provide protection against injury in the event of an accident. However, some vehicle headrests have also been provided with lateral headrest elements. Exemplary of such a headrest is that described in U.S. Pat. No. 5,997,091 issued to Rech et al.

Even more complex headrests have been designed for use in military aircraft and, more particularly in military aircraft for use in conjunction with ejection seats. Typical of this class of headrest design are those disclosed in U.S. Pat. No. 4,883,243 and U.S. Pat. No. 4,899,961 both issued to Herndon. Another such headrest design is disclosed in U.S. Pat. No. 4,466,662 issued to McDonald et al.

In addition to the development of headrests for use in military aircraft, significant advances have been made in recent years in the design of headrests for use in commercial aircraft. Exemplary of such headrests are those described in U.S. Pat. Nos. 6,250,716, 6,467,846, 6,666,517, 7,040,705, 7,264,313 and 7,364,239 issued to Clough.

As will become clear from the discussion that follows, the headrest of the present invention represents a substantial improvement over the prior art headrests and provides significantly greater ease of adjustability and therefore greater support and comfort to the user.

BRIEF DESCRIPTION OF THE DRAWINGS

FIG. 4A is a greatly enlarged view taken along lines 4A-4A of FIG. 1.

FIG. 4B is a view similar to FIG. 4A, but showing the friction detent hinge moved from a first, at rest position, to a second position.

FIG. 4C is a view similar to FIG. 4B, but showing the friction detent hinge moved from the second position to a third position.

SUMMARY OF THE INVENTION

It is an object of the present invention to provide an adjustable headrest that provides both support and comfort to the user and can be used in connection with furniture including household and office furniture and also in connection with various types of passenger vehicles.

Another object of the invention is to provide a headrest of the aforementioned character that includes slide means for permitting easy height adjustment of the headrest and also includes a friction imparting assembly for holding the headrest in a desired elevated position.

Another object of the invention is to provide easily adjustable, wing like, side support panels that are pivotally connected to a centrally located, vertically adjustable head support panel by means of novel friction hinges that include detent features that permit the wing like side support panels of the headrest to be locked into predetermined angular orientations.

Another object of the invention is to provide a seat connector that can be readily connected to a vehicle seat.

Another object of the invention is to provide a headrest construction of the class described that is of a simple construction and one that can be inexpensively produced and maintained.

DESCRIPTION OF THE INVENTION

Figure 1:
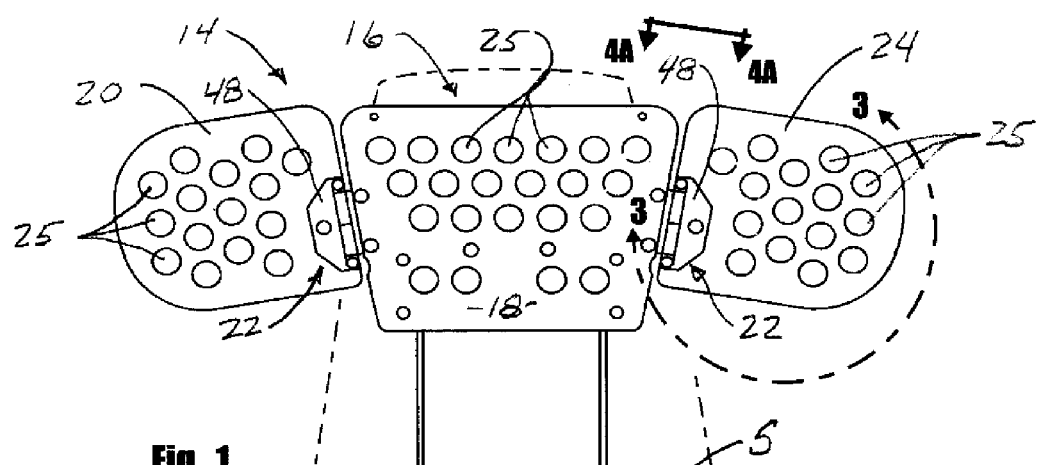
FIG. 1 is a front view of one form of the seat headrest apparatus of the invention.
Figure 2:
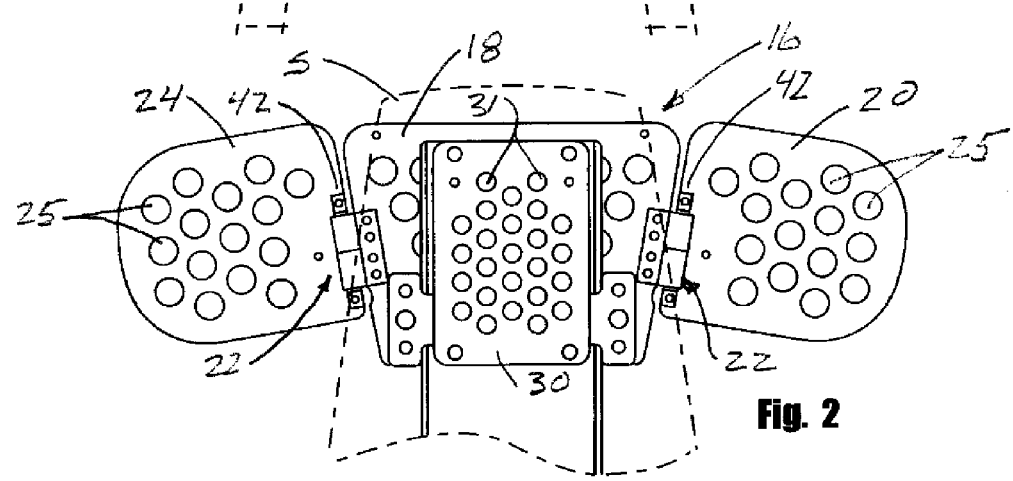
FIG. 2 is a rear view of the seat headrest apparatus shown in FIG. 1.

Referring to the drawings and particularly to FIGS. 1 and 2, one form of the seat headrest of the invention is there illustrated and generally designated by the numeral 14. The seat headrest here comprises a support assembly 16 that includes a first, centrally disposed head support panel 18, a second side panel 20 that is connected to panel 18 by a novel friction hinge assembly 22 and a third side panel 24 that is connected to central panel 18 by a novel friction hinge assembly 22. To reduce the overall weight of the headrest, central head support panel 18, as well as side panels 20 and 24, are each provided with a multiplicity of weight reduction apertures 25.

Figure 5:
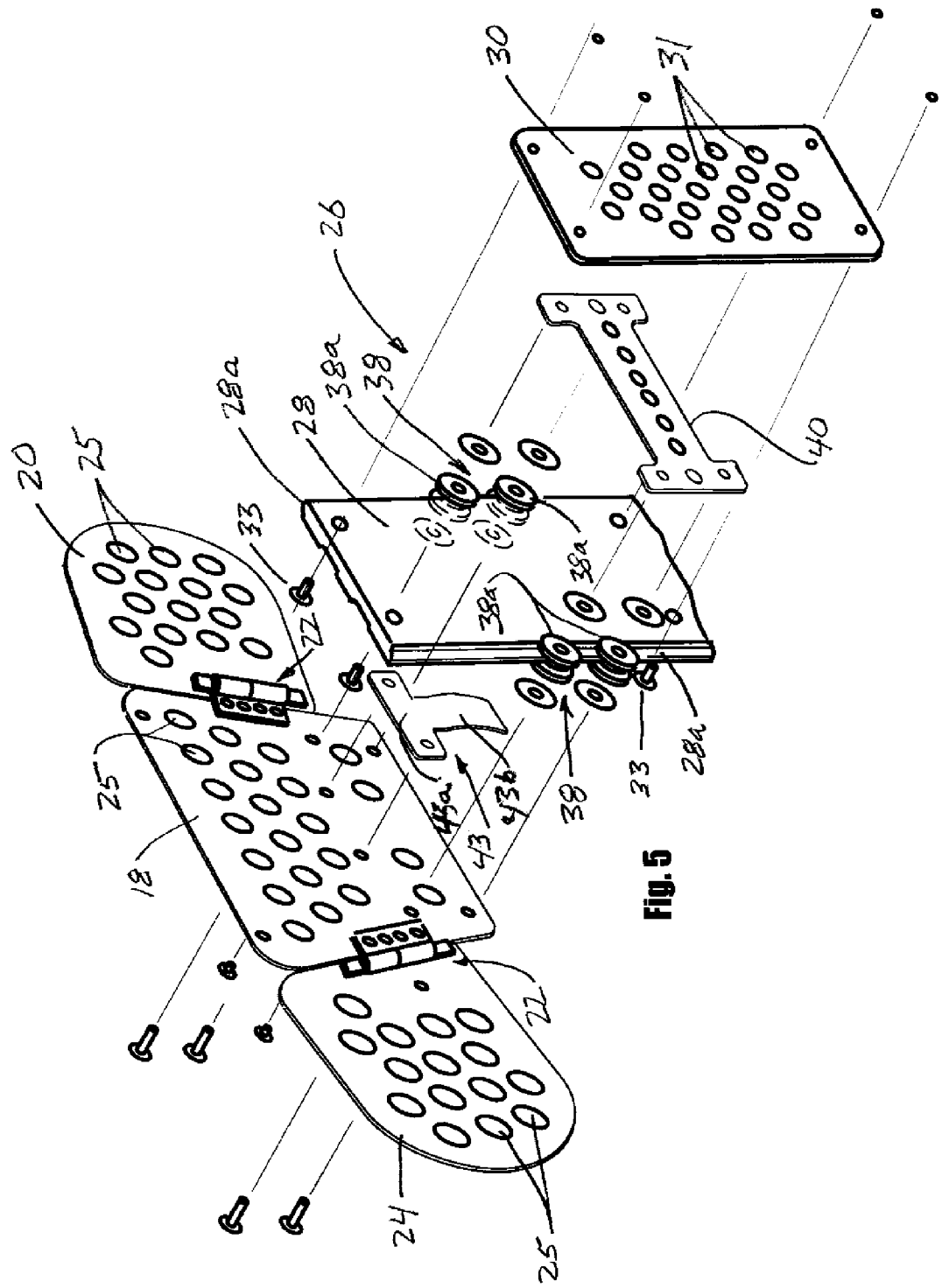
FIG. 5 is a generally perspective, exploded rear view of the seat headrest shown in FIG. 1.
Figure 6:
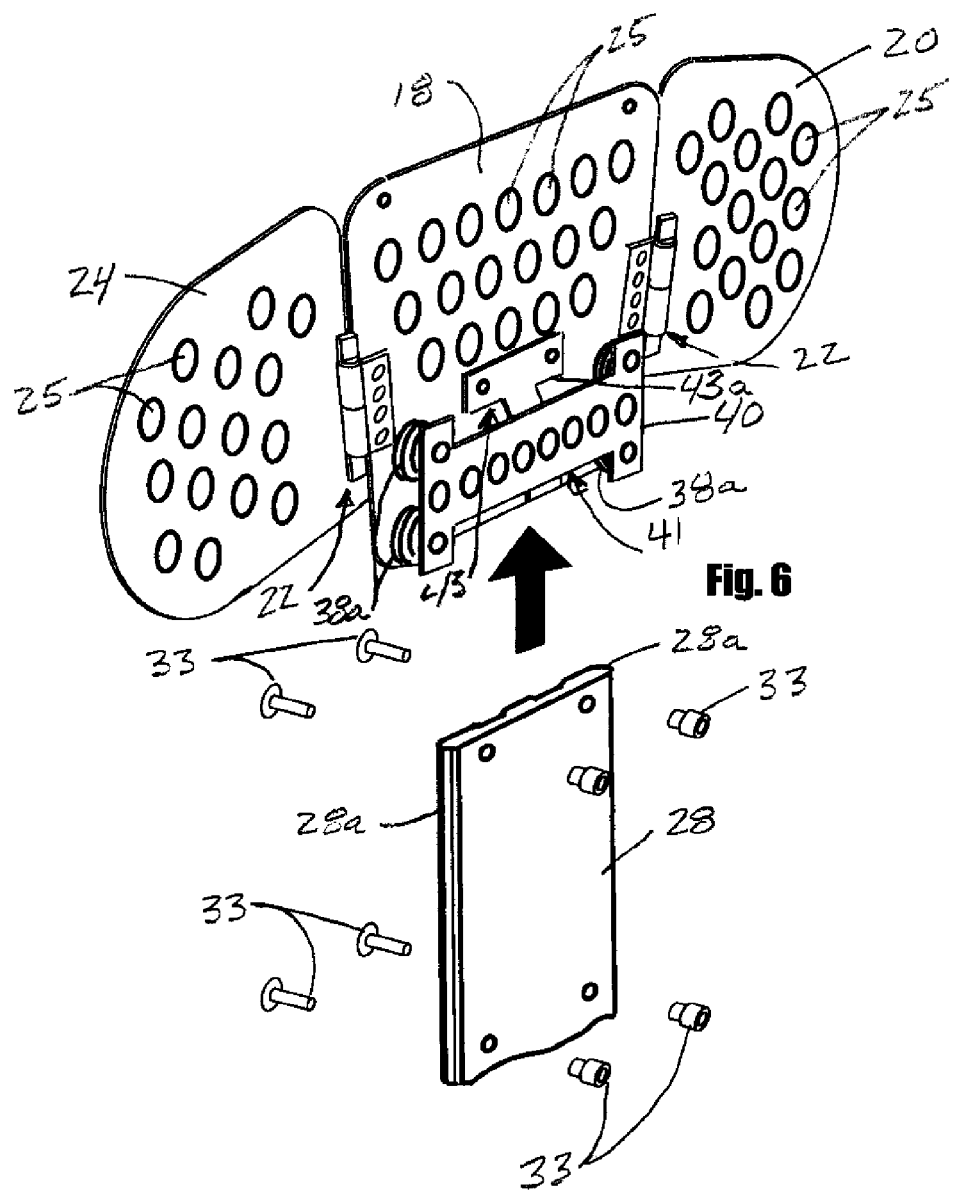
FIG. 6 is a generally perspective, exploded rear view of the seat headrest shown in FIG. 5 illustrating the upward movement of the headrest relative to the elongated guide of the apparatus.
Figure 7:
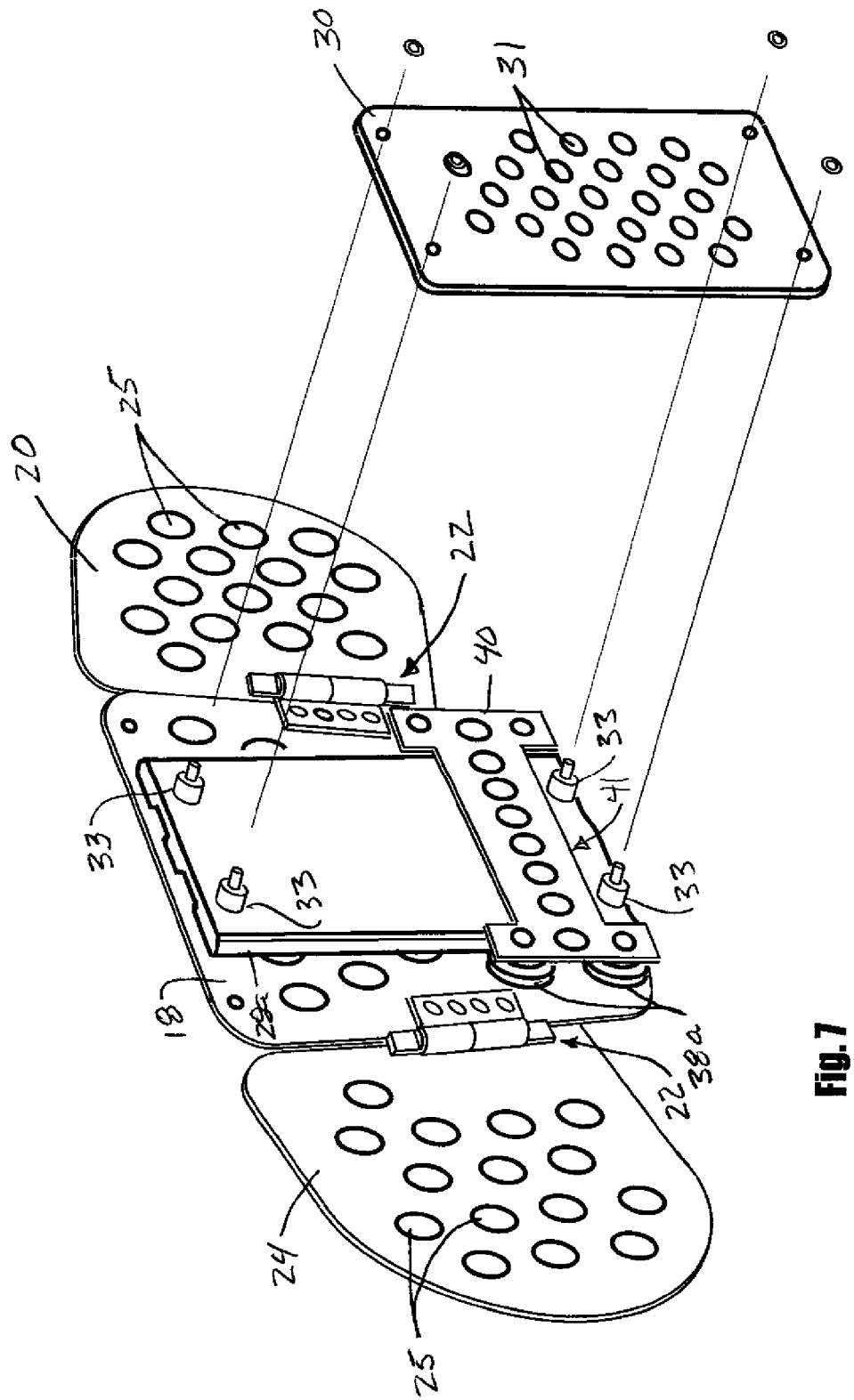
FIG. 7 is a generally perspective, exploded rear view of the seat headrest shown in FIG. 6 illustrating the manner of interconnection of the seat connector plate of the apparatus to the elongated guide.
Figure 8:
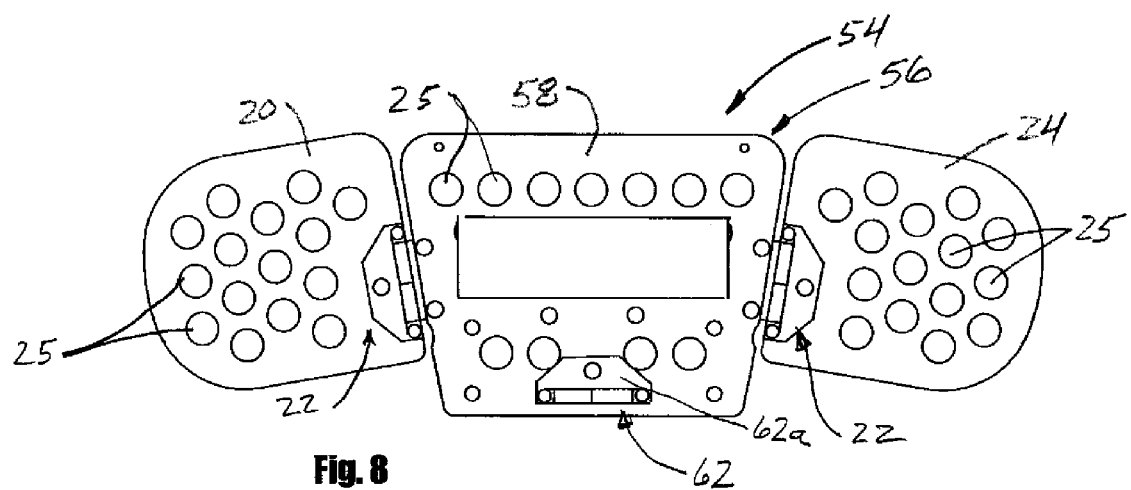
FIG. 8 is a front view of an alternate form of seat headrest apparatus of the invention.
Figure 9:
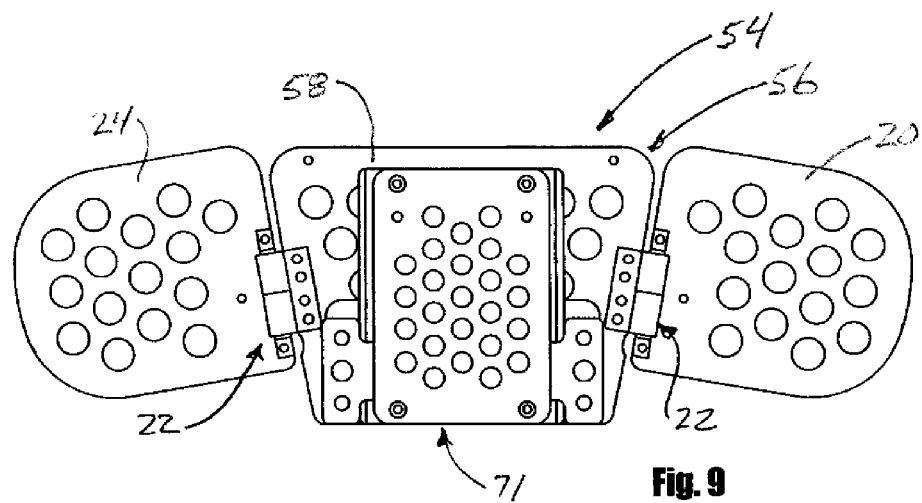
FIG. 9 is a rear view of the alternate form of seat headrest apparatus of the invention shown in FIG. 8.

As will be discussed in greater detail hereinafter, side panels 20 and 24 are pivotally movable from an at rest position wherein they are substantially coplanar with the central head support panel 18 to selected angularly extending forward positions. When side panels 20 and 24 are pivoted into selected angularly forward positions, they can provide a comfortable lateral support to the passenger's head. As best seen in FIGS. 1, 2 and 5 of the drawings, support assembly 16 is connected to a mounting assemblage 26 that here comprises an elongated guide 28 and a connector plate 30 that can be connected to a seat "S" by any suitable means such as suitable connectors 33 (Figures land 5). Elongated guide 28 includes oppositely disposed guide rails 28a that are adapted to be rollably engaged by two sets of transversely spaced apart roller assemblies 38 that are mounted on central head support panel 18. The roller assemblies 38, each of which are of identical construction, include grooved rollers 38a that roll along guide rails 28a so that the headrest assembly 16 can be adjustably moved upwardly and downwardly so as to enable the desired adjustment in the height of the assembly. A transversely extending connector member 40 spans the spaced apart rollers in the manner illustrated in FIG. 5 and defines a guide channel 41 within which guide 28 is disposed (see also FIG. 6). To reduce the overall weight of the assembly, connector plate 30 is provided with a multiplicity of weight reduction apertures 31.

Figure 3:
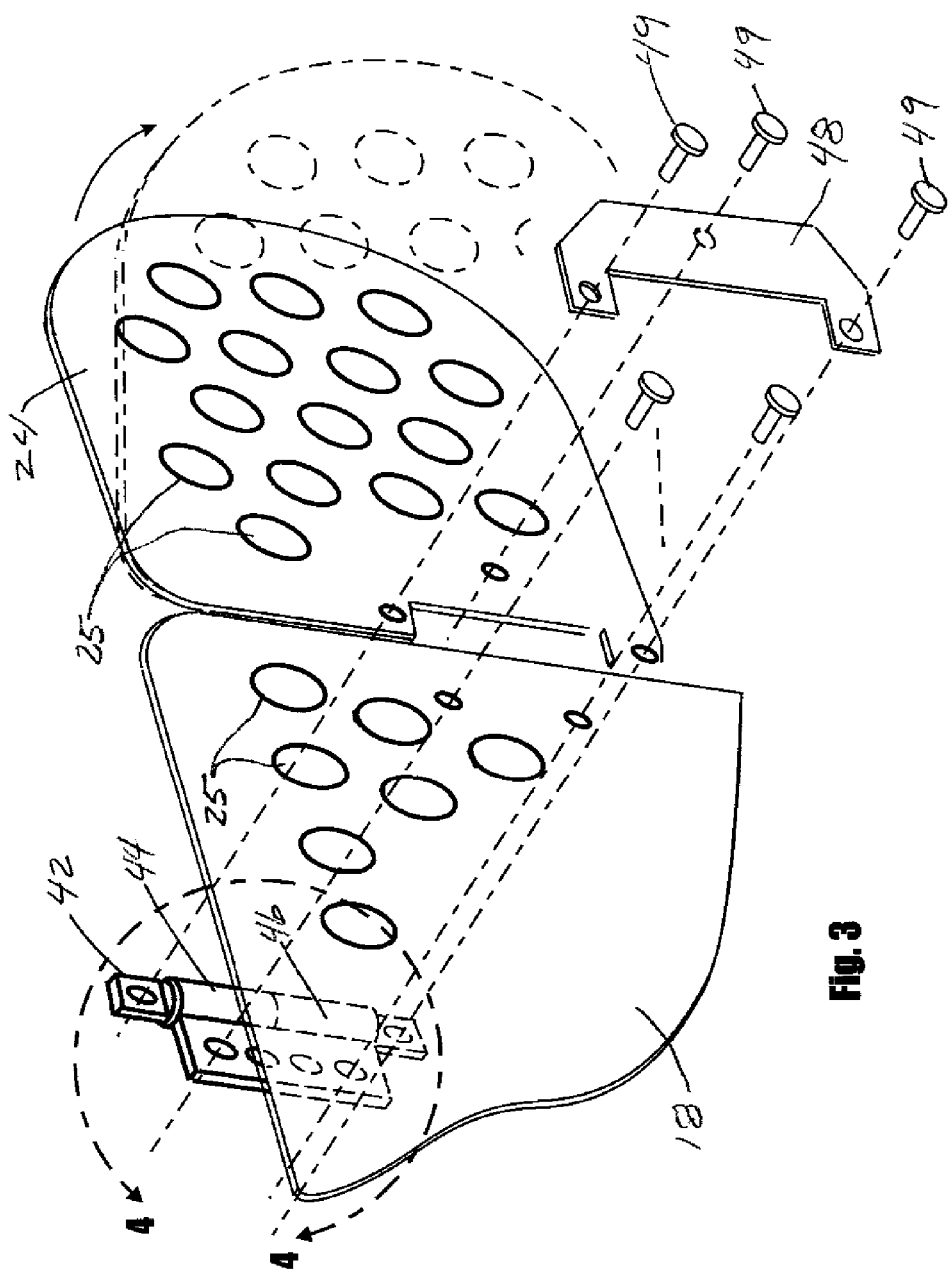
FIG. 3 is a greatly enlarged, generally perspective, exploded view of the area designated in FIG. 1 as 3-3.
Figure 4:
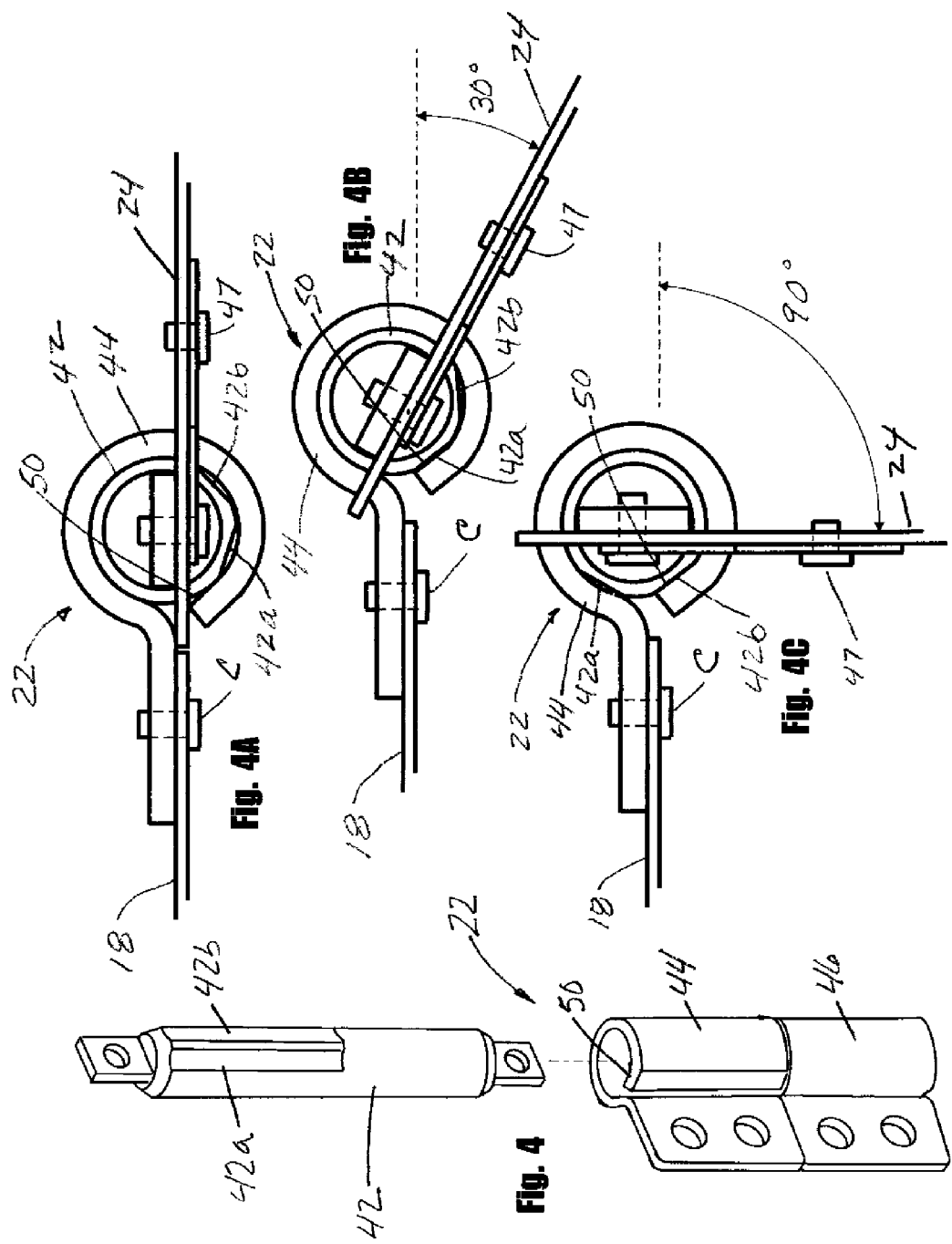
FIG. 4 is a greatly enlarged, generally perspective, exploded view of the area designated in FIG. 3 as 4-4 showing the construction of one form of the friction detent hinge of the seat headrest apparatus.

Forming an important aspect of the headrest assembly of this latest form of the invention is a resistance imparting assembly for imparting resistance to the movement of headrest assembly 16 upwardly and downwardly relative to guide 28. In the present form of the invention, this novel resistance imparting assembly comprises a uniquely configured, generally T-shaped leaf spring designated in the drawings by the numeral 43. As best seen in FIGS. 3 and 4, spring 43 includes a transverse connector portion 43a that is affixed to central head support panel 18 and a downwardly extending, curved central portion 43b that extends into channel 41. When the headrest assembly 16 is mounted on guide 28 in the manner shown in FIG. 5, the curved central portion 43b of the spring will be yieldably deformed so that it is brought into pressural engagement with the guide. With this construction, as the headrest assembly is moved upwardly and downwardly, the central portion 43b of the spring will frictionally engage the surface of the guide 28 and will yieldably resist sliding movement of headrest assembly 16 relative to the guide.

Referring particularly to FIGS. 3 and 4 of the drawings, the friction hinge assemblies 22 of this embodiment of the invention can be seen to comprise an elongated, generally cylindrical shaped shaft 42 and first and second bands 44 and 46 that are rotatably carried by shaft 42 (see FIG. 3). Importantly, shaft 42 is provided with a pair of circumferentially spaced detents, or flats 42a and 42b (FIGS. 4 and 4A). As used herein, the term "detent" means a device for positioning and holding one part in relation to another in a manner such that the device can be released by force applied to one of the parts.

First and second bands 44 and 46 of each of the hinge assemblies 22 are connected to central panel 18 by suitable connectors "C", while one of the shafts 42 of the hinge assemblies 22 is connected to the side panel 20 and the other of the shafts is connected to the side panel 24. As best seen in FIG. 3 of the drawings, the shafts 42 are connected to the side panels by means of connector leaves 48 and suitable connectors 49.

Importantly, band 44 of each of the hinge assemblies is provided with a detent engaging segment, or flat 50 that, as the band is rotated, is engageable with a selected one of the detents 42a and 42b of shaft 42 to prevent rotation of the band relative to the shaft. This novel detent feature of the friction hinges allows the user to feel the hinge snap into position when the hinge is rotated to a certain angle. More particularly, when the band is rotated around the shaft to the point where the detent engaging segment aligns with the detent on the shaft, the hinge snaps into place giving the user a positive indication that the hinge is in a selected position. The strength and feel of the detent feature is dependent on various factors including the depth of the flat on both the shaft and the band, the size of the shaft, the thickness of the band material, the hardness on both the shaft and the band, the type of grease used, the type of surface treatment done on the shaft and the band and the amount of interference between the shaft and the band. Hinge assemblies 22 are readily commercially available from Hanaya Inc. of Ponte Vedra, Fla.

As illustrated in FIG. 4A of the drawings, when the central panel 18 and the side panels are disposed in an at rest, coplanar configuration, the flat 50 on the band 44 resides in engagement with the cylindrical surface of the shaft 42. It is to be noted that FIGS. 4A through 4C of the drawings show only part of central panel 18 and side panel 24 and illustrate only the angular adjustment of side panel 24. However, it is to be understood that the angular adjustment of side panel 20 is accomplished in exactly the same manner as the angular adjustment of side panel 24. Referring particularly to FIG. 4A, when the side panel 24, along with shaft 42 is rotated approximately 30 degrees into the position shown in FIG. 4B, flat 50 on the band 44 will snap into engagement with detent, or flat 42a on the shaft 42, thereby locking the side panel into the angularly inwardly extending position. Further rotation of the side panel, along with shaft 42, will cause the flat 50 to move out of engagement with detent 42a and into the position shown in FIG. 4C. In this position, the flat 50 on the band will snap into engagement with detent, or flat 42b provided on shaft thereby locking the side panel into the approximately 90 degree angularly inwardly extending position shown in FIG. 4C.

Referring next to FIGS. 8 through 12, an alternate form of seat headrest of the invention is there illustrated and generally designated by the numeral 54. This alternate form of the seat headrest is similar in many respects that illustrated in FIGS. 1 through 7 and like numbers are used in FIGS. 8 through 12 to identify like components. Seat headrest 54 here comprises a support assembly 56 that includes a central head support member 58, a first lateral, or side panel 20 that is connected to member 58 by a novel friction hinge 22 and a second lateral, or side panel 24 that is connected to central member 58 by a novel friction hinge 22. As before, to reduce the weight of the central head support member 58, and side panels 20 and 24, each is provided with a multiplicity of weight reduction apertures 25.

As in the earlier described embodiment of the invention, side panels 20 and 24 are pivotally movable from an at rest position wherein they are substantially coplanar with the central head support member 58 to selected angularly extending forward positions. Angular movement of side panels 20 and 24 is accomplished substantially identical manner to that described in connection with the embodiment of FIGS. 1 through 7.

Figure 10:
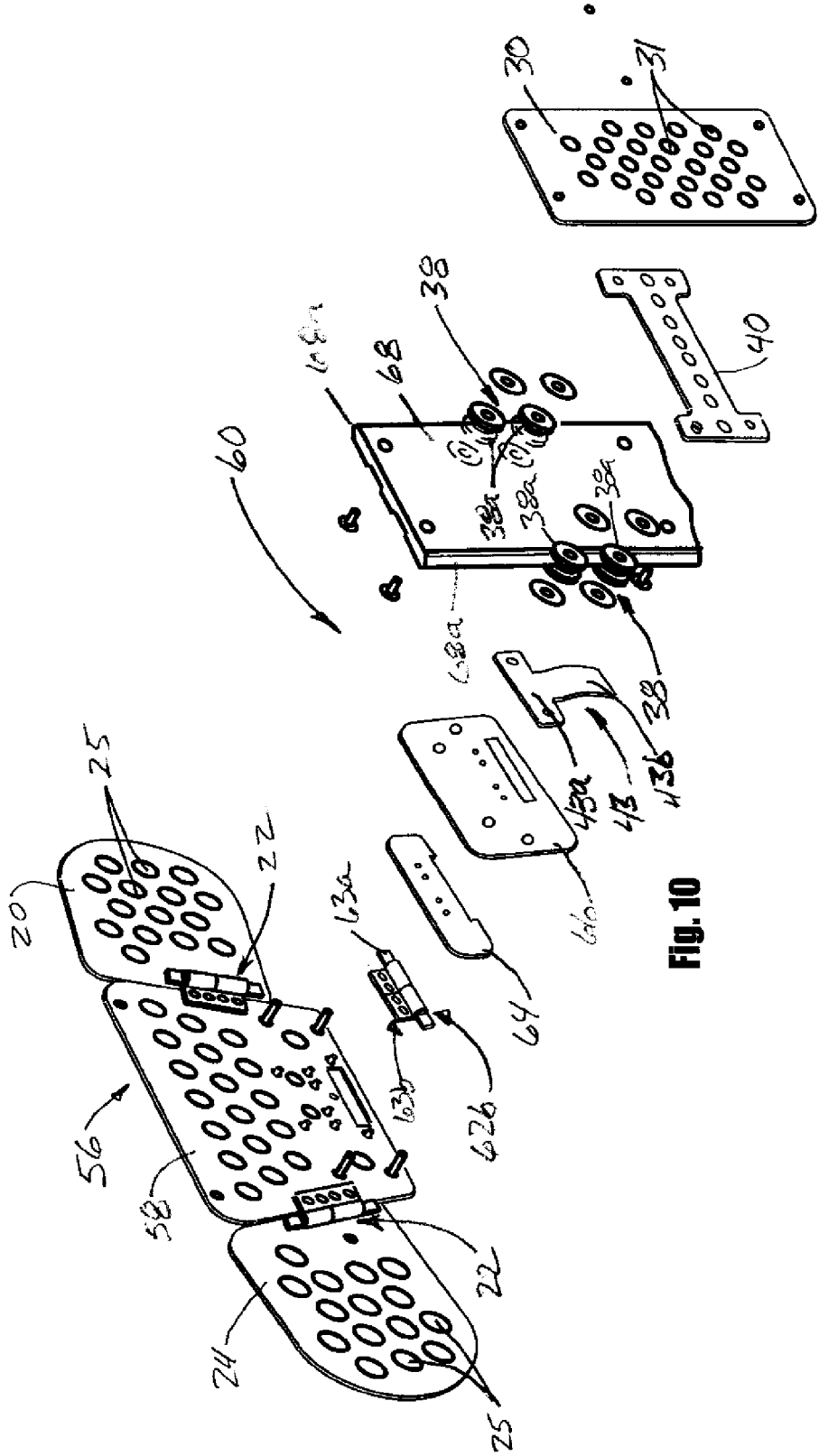
FIG. 10 is a generally perspective, exploded rear view of the alternate form of seat headrest shown in FIG. 9.
Figure 11:
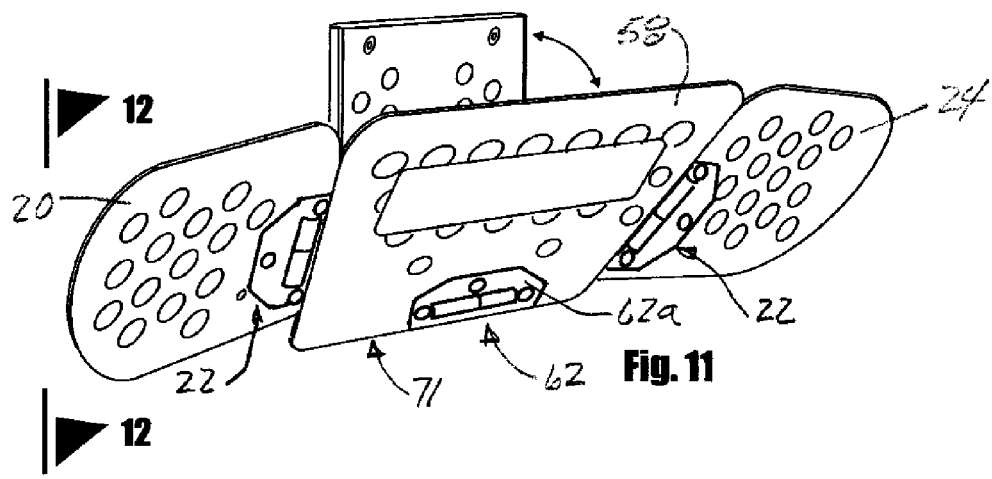
FIG. 11 is a front view of the alternate form of seat headrest apparatus of the invention shown in FIG. 8 showing the headrest assembly pivoted forwardly relative to the elongated guide of the apparatus.
Figure 12:
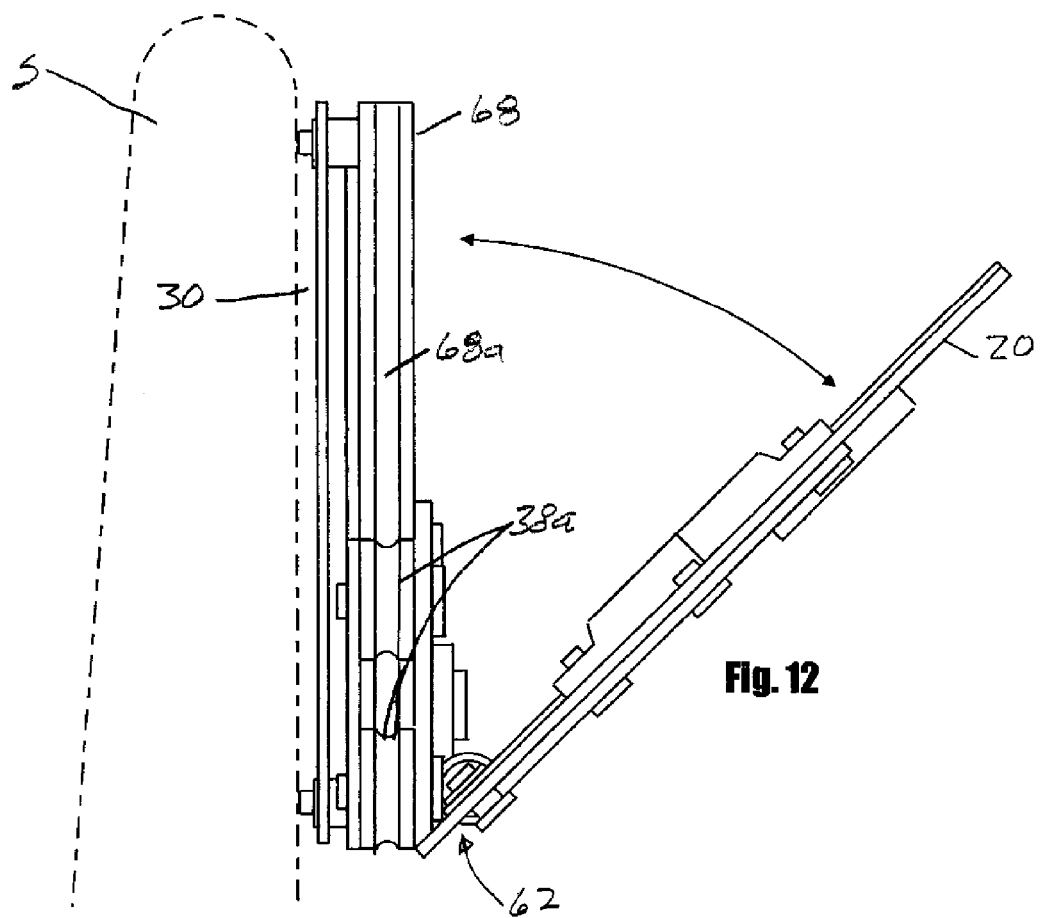
FIG. 12 is an enlarged view taken along lines 12-12 of FIG. 11.

The primary difference between this latest embodiment of the invention and that illustrated in FIGS. 1 through 7 resides in the fact that support assembly 56 is pivotally connected to a mounting assembly 60 that is of a slightly different construction from mounting assembly 26 (FIG. 10). More particularly, support assembly 56 is pivotally connected to mounting assembly 60 by a conventional, generally commercially available tilt hinge assembly 62 that includes a first leaf 62a that is connected to the front surface of head support member 58 (see FIG. 8) and a second connector assembly 62b that is connected to the rear surface of the central panel (see FIG. 10). Tilt hinge assembly 62 includes a shaft 63a and a pair of bands 63b.

Second connector assembly 62b is, connected to a connector member 64 which forms a part of mounting assembly 60 (see FIG. 10). As indicated in FIG. 10, connector member 64 is connected to a connector member 66 which is, in turn, connected to an elongated guide 68. Guide 68 is of similar construction to guide 28 and can be connected to a seat "S" by any suitable means. Elongated guide 68 includes oppositely disposed guide rails 68a that are adapted to be rollably engaged by two pairs of spaced apart roller assemblies 38 that are mounted on central head support member 58. The roller assemblies 38, each of which are of identical construction, include grooved rollers 38a that roll along guide rails 68a so that the headrest assembly 56 can be adjustably moved upwardly and downwardly so as to enable the desired adjustment in the height of the assembly. A connector member 40 spans the spaced apart rollers and defines a channel 71 within which guide 68 is disposed (see also FIG. 9).

Forming an important aspect of the headrest assembly of this latest form of the invention is a resistance imparting spring for imparting resistance to the movement of headrest assembly 56 upwardly and downwardly relative to guide 68. As before, this novel resistance imparting spring comprises a uniquely configured leaf spring 43 that includes a transverse connector portion 43a that is affixed to connector member 66 and a downwardly extending central portion 43b that extends into channel 41. When the headrest assembly 56 is mounted on guide 68 in the manner shown in the drawings, the central portion 43b of the spring will be yieldably deformed so that it is brought into pressural engagement with the guide. With this construction, as the headrest assembly is moved upwardly and downwardly, the central portion 43b of the spring will frictionally engage the surface of the guide 68 and will yieldably resist sliding movement of headrest assembly 56 relative to the guide. As before, guide 68 is connected to a connector member 30 which is connected to seat "S" in the manner illustrated FIG. 12.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A seat headrest assembly interconnectable with a seat comprising:
    (a) a connector member; and
    (b) a support assembly connected to said connector member, said support assembly comprising:
        (i) a first support panel;
        (ii) a second support panel pivotally connected to said first support panel for enabling said second support panel to be disposed at varying angular positions relative to said first support panel;
        (iii) a shaft connected to a selected one of said first and second support panels, said shaft having a detent; and
        (iv) a band connected to the other of said first and second support panels, said band including a portion wrapped about said shaft, said portion including a detent engaging segment engagable with said detent, said detent engaging segment comprising a flat formed upon said portion wrapped about said shaft.

2. The seat headrest as defined in claim 1 in which said headrest assembly further comprises:
    (a) a plurality of rollers connected to said first support panel; and
    (b) an elongated guide connected to said connector member and disposed in rollable engagement with said plurality of rollers for movement between a first lowered position and a second elevated position.

3. The seat headrest assembly as defined in claim 2 in which said headrest assembly further comprises a resistance imparting assembly connected to said central support panel for yieldably resisting movement of said headrest assembly between said first lowered position and said second elevated position.

4. The seat headrest assembly as defined in claim 3, in which said resistance imparting assembly comprises a spring connected to said first support panel proximate said rollers.

5. The seat headrest assembly as defined in claim 3 in which said first support panel is pivotally connected to said elongated guide for movement between a first position and a second position.

6. The seat headrest assembly as defined in claim 3 in which said plurality of rollers comprise two transversely spaced apart sets of grooved rollers connected to said first support panel.

7. The seat headrest assembly as defined in claim 6 further comprising a transversely extending connector member connected to and spanning said two transversely spaced apart sets of rollers.

8. A seat headrest assembly interconnectable with an aircraft seat comprising:
    (a) a mounting assembly, including a connector member; and
    (b) a support assembly connected to said mounting assembly, said support assembly comprising:
        (i) a central support panel; and
        (ii) first and second side panels, each connected to said central support panel by a hinge assembly, said hinge assembly comprising:
            a. a shaft having a detent; and
            b. a band rotatably carried by said shaft, said band having a detent engaging segment engageable with said detent of said shaft to prevent rotation of said band relative to said shaft said detent engaging segment comprising a flat formed on said band.

9. The seat headrest assembly as defined in claim 8 in which said mounting assembly further includes an elongated guide connected to said connector member and in which said headrest assembly further comprises a plurality of rollers connected to said central support panel, said elongated guide being disposed in rolling engagement with said plurality of rollers for movement between a first lowered position and a second elevated position.

10. The seat headrest assembly as defined in claim 9 in which said plurality of rollers comprise two transversely spaced apart sets of grooved rollers connected to said central support panel.

11. The seat headrest assembly as defined in claim 10 in which said elongated guide includes oppositely disposed guide rails engageable by said plurality of grooved rollers.

12. The seat headrest assembly as defined in claim 10, further comprising a transversely extending connector member connected to and spanning said two transversely spaced apart sets of grooved rollers.

13. The seat headrest assembly as defined in claim 10 in which said headrest assembly further comprises a resistance imparting assembly connected to said central support panel, said resistance imparting assembly yieldably resisting movement of said headrest assembly between said first lowered position and said second elevated position.

14. The seat headrest as defined in claim 13, in which said resistance imparting assembly comprises a generally T-shaped leaf spring connected to said central support panel proximate said rollers.

15. The seat headrest as defined in claim 13 in which said central support panel and each of said first and second side panels are provided with a plurality of spaced apart, weight reduction apertures.

16. A seat headrest assembly interconnectable with a seat comprising:
 (a) a mounting assembly comprising a connector member and an elongated guide connected to said connector member; and
 (b) a support assembly connected to said elongated guide, said support assembly comprising:
  (i) a central support panel; and
  (ii) first and second side panels, each connected to said central support panel by a hinge assembly, said hinge assembly comprising:
   a. a shaft having a pair of circumferentially spaced flats; and
   b. a band rotatably carried by said shaft, said band having a flat engageable with said pair of circumferentially spaced flats of said shaft to prevent rotation of said band relative to said shaft.

17. The seat headrest assembly as defined in claim 16 in which said headrest assembly is pivotally connected to said elongated guide for pivotal movement between first and second positions.

18. The seat headrest assembly as defined in claim 17 in which said headrest assembly further comprises a plurality of rollers connected to said central support panel, said elongated guide being disposed in rolling engagement with said plurality of rollers for movement between a first lowered position and a second elevated position.

19. The seat headrest assembly as defined in claim 18 in which said headrest assembly further comprises a resistance imparting assembly connected to said central support panel, said resistance imparting assembly yieldably resisting movement of said headrest assembly between said first lowered position and said second elevated position.

20. The seat headrest assembly as defined in claim 19, in which said resistance imparting assembly comprises a generally T-shaped leaf spring connected to said central support panel proximate said rollers.

\* \* \* \* \*